3,598,886
HYDROGENATED BLOCK COPOLYMERS
Donald F. Hoeg, Mount Prospect, Eugene P. Goldberg, Highland Park, and John F. Pendleton, Park Ridge, Ill., assignors to Borg-Warner Corporation, Chicago, Ill.
No Drawing. Filed Sept. 15, 1965, Ser. No. 487,616
Int. Cl. C08f *15/04, 27/24*
U.S. Cl. 260—879R — 4 Claims

ABSTRACT OF THE DISCLOSURE

Hydrogenated block copolymers of conjugated dienes and monovinyl aromatic compounds are described.

---

This invention relates to linear block copolymers and more particularly to block copolymers of vinylcyclohexanes and olefins in which block sequences of poly(vinylcyclohexanes) are covalently bound to block sequences of an alkyl-substituted polyethylene.

Homopolymers of vinylcyclohexane have been known in the art for many years, but have not demonstrated commercial value. These polymers have been characterized as clear, rigid, plastics having high heat distortion temperatures but relatively poor impact strengths. Those efforts made to blend rubbery materials with the homopolymers of vinylcyclohexane to improve their impact strength, did not meet with any measure of success and the resulting blends were cloudy, opaque materials with relatively poor impact resistance. Perhaps the primary reason that the homopolymers of vinylcyclohexane were difficult to blend was due to their incompatibility with rubber-like materials.

Vinylcyclohexane copolymers containing a majority of poly(vinylcyclohexane) structural units and lesser amounts of other structural units randomly interspersed in the main chain have also been prepared. Two hydrogenated polystyrene copolymers of this type are described in British Pats. 933,596 and 933,127 issued to Badische-Anilin and Soda Fabrik Aktiengesellschaft. These hydrogenated polystyrene copolymers do not possess any marked improvements in physical properties over the properties of the homopoly(vinylcyclohexane). In fact, these copolymers generally lack a commercially valuable combination of physical and chemical properties. For example, the vinylcyclohexane-ethylene copolymer disclosed in British Pat. 933,596 (containing 10 percent ethylene) has a substantially lower softening temperature than vinylcyclohexane homopolymers. Similar polymers prepared by applicants herein have also shown very poor impact strength.

Several copolymers have also been described containing relatively small amounts of vinylcyclohexane sequences derived from the partial hydrogenation of styrene-isoprene-styrene ternary block copolymers, e.g., South African Pat. 641,910. These materials are characterized by being rubbery, low tensile strength materials, however, they exhibit poor aging characteristics. The residual unsaturation in these materials contributes to the poor aging characteristics, specifically on exposure to actinic radiation. While not directed to vinylcyclohexane copolymers, British Pat. 863,256 discloses the partial hydrogenation of one styrene-butadiene copolymer (containing 30 percent by weight styrene); this copolymer is alleged to have good tensile strength and low temperature flexibility. This copolymer does not, however, possess properties as favorable as those of the vinylcyclohexane copolymers and in particular shows poorer aging characteristics as well as incompatibility with homopolymer (vinylcyclohexane).

The present invention is directed to vinylcyclohexane-alkylsubstituted polyethylene block polymers wherein the polymers contain from about 8 to about 82 mole percent vinylcyclohexane block structural units and correspondingly between about 92 and about 18 mole percent alkyl-substituted polyethylene block structural units.

An essential feature of the copolymers of this invention is that they contain in excess of 18 mole percent of the alkyl-substituted polyethylene segments. Copolymers containing less than 18 mole percent are of limited commercial value and exhibit grossly inferior properties. Those block copolymers containing 18 mole percent and higher alkyl-substituted polyethylene sequences have an extraordinary combination of physical and chemical properties ranging from tough, rigid, high heat distortion thermoplastics to strong thermoplastic elastomers depending, or course, upon composition.

The vinylcyclohexane-alkyl polyethylene block copolymers of this invention contain vinylcyclohexane structural units in linear polymer block sequences of the formula:

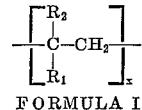

FORMULA I wherein $R_1$ is a cyclohexyl or substituted cyclohexyl group, and $R_2$ is hydrogen or an alkyl group and $x$ is a whole number between 1 and 25,000 covalently linked to linear polymeric block segments of an alkyl-substituted polyethylene of the formula:

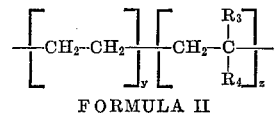

FORMULA II wherein $R_3$ may be hydrogen or a methyl group and $R_4$ is a hydrogen, methyl, ethyl, or isopropyl group, and $y$ and $z$ are whole numbers between 1 and 25,000 in the ratio $y/x$ between 25/1 and 1/100 such that $y+z \leq 25,000$. In the block copolymers of this invention, at least one of $x$ and $(y+z)$ are equal to or greater than 25.

In a preferred embodiment of this invention, in Formula I above, $R_1$ is a cyclohexyl group and $R_2$ is hydrogen, and in Formula II above, $R_3$ is hydrogen and $R_4$ is a pendant ethyl group or a pendant methyl group.

Those copolymers containing in excess of about 50 mole percent of poly(vinylcyclohexane) block sequences are rigid, optically clear plastics of high heat distortion temperature and high tensile strength with good environmental stability and excellent impact strength. The rigid materials are very tough copolymers that are useful for making injection molded parts, extruded film, pipe, fibers and the like.

Those copolymers containing more than about 50 mole percent alkyl-substituted polyethylene sequences tend to be flexible and rubbery. In particular, those containing above about 65 mole percent are rubbery copolymers having good tensile strength, extensibility, and heat shrinkability as well as exceptional aging stability and low temperature flexibility. The flexible products are useful in applications such as wire coatings, packaging materials, films, fibers, extruded and molded products, etc. The flexible products are also unique in that they are excellent blending agents and are compatible with homopoly(vinylcyclohexane) or copolymers containing poly(vinylcyclohexane). When these products are blended with poly(vinylcyclohexane) polymers, the resulting blends have excellent properties including especially outstanding impact strengths.

The copolymers of the present invention are conveniently prepared by the essentially complete hydrogenation of vinyl-substituted aromatic hydrocarbon-conjugated diene block copolymers. In order to obtain the unique overall properties of the compositions of this invention, it is essential that the vinyl-cyclohexane block copolymers contain only minimal amounts of residual unsaturation after hydrogenation, generally less than 3 percent aromatic unsaturation. As herein defined, therefore, complete hydrogenation is hydrogenation to the point where less than about 3 percent aromatic unsaturation remains. Since hydrogenation of the aromatic unsaturation is more difficult than the aliphatic unsaturation, the degree of hydrogenation of aromatic unsaturation in this invention insures essentially complete hydrogenation of the aliphatic unsaturation.

The preferred unsaturated block copolymer substrates utilized in preparing the copolymers of this invention include linear, soluble, gel-free, block copolymers of vinyl aromatic monomers such as styrene, α-methylstyrene, α,o-dimethylstyrene, vinyltoluene, α,m-dimethylstyrene, α,p-dimethylstyrene, vinylanisole, vinylnaphthalene, vinyl biphenyl, o-chlorostyrene, m-chlorostyrene, p-chlorostyrene, o, m, or p-fluorostyrene, and vinylpyridine combined with a conjugated diene such as butadiene, isoprene, chloroprene, dimethylbutadiene, 1,3-pentadiene or the like. Unsaturated block copolymer substrates of mixtures of the aforementioned monomers may also be utilized.

The unsaturated block copolymer substrates utilized in this invention may be prepared by a variety of methods such as by using alkali metals or organolithium compounds as polymerization initiators to cause formation of block sequences in a hydrocarbon solution. It will be noted that a variety of different block structures may be obtained by varying the monomer addition sequences, rate of addition, temperature and solvent. For example, it is known that addition of an alkyllithium compound, such as n-butyllithium, to a mixture of butadiene-styrene in a hydrocarbon solvent produces a block copolymer consisting of a block of predominantly pure polystyrene sequences linked to a block of more or less mixed styrene-butadiene sequences. Polymers prepared in this manner, i.e., when both monomers are present initially, are hereinreferred to as mixed-block copolymers.

In the absence of reactive compounds such as water, carbon dioxide, oxygen, proton sources in general, and the like, the polymerizations initiated by organolithium compounds in hydrocarbon solutions will be essentially free of chain termination or transfer events so that a multitude of block copolymer structures may be obtained by sequential addition of monomers. Subsequent to the complete polymerization of one monomer, a second monomer may be added to produce a new polymeric block sequence linked to the previously formed polymeric sequence to provide a block copolymer of the type AB, where A and B are distinct polymer block segments. Block sequence length may also be controlled since the chain length depends only upon the amount of polymerizable monomer present and the number of active polymer chain ends. By alternating the sequence as well as monomer type, the block structure, i.e., length and distribution, can be controlled and block polymers derived from a plurality of monomers may be prepared.

Those polymers prepared by sequential addition of monomers will be referred to herein as pure block structures. Mixed block copolymers of styrene and butadiene will be referred to herein as $SB^M$, binary styrene-butadiene pure block copolymers as SB, ternary styrene-butadiene-styrene pure block copolymers as SBS, ternary butadiene-styrene-butadiene as BSB and styrene-isoprene polymers as $SI^M$, SI, SIS, ISI, SISIS, etc. as the case may be. When difunctional initiators, such as dilithiopentane are utilized in preparing the block copolymers of this invention, it is possible to make ternary block copolymers, as for example from styrene-butadiene, wherein the terminal portions are block homopolymers (homopolystyrene) and the central portions are of mixed block structure. Pure block structures may also be prepared using difunctional initiators via the sequential addition of monomers as mentioned with respect to the pure block structures prepared with monofunctional initiators.

Inasmuch as the solvent and other factors will exert an influence upon the microstructure of the polydiene segments, control of the geometric isometry of the diene block sequences in the block polymer substrates is also possible. The microstructure of the substrates is important because it will influence the properties of the resulting fully hydrogenated poly(vinylcyclohexane) block copolymers. For example, block sequences derived from butadiene polymerized 1,4 yield, upon hydrogenation, unsubstituted polyethylene sequences. Those sequences which enter the polymeric block via 1,2 polymerization yield ethyl-substituted polyethylene sequences upon hydrogenation. The block sequences of 1,4-poly(isoprene) result in methyl-substituted polyethylene sequences in amounts corresponding to one methyl-substituted methylene group for every three methylene sequences. Block sequences containing poly(isoprene) segments derived from 1,2 isoprene polymerization result in a methyl and ethyl substituent on the same carbon atom of the polyethylene chain.

As complete stereospecificity in the polymerization of the diene is rarely obtained, a mixture of microstructures may be observed in the polydiene block sequences of the substrates utilized in preparing the block copolymers of this invention. For example, in the substrates derived from the block polymerization of styrene and butadiene, with an organolithium reagent, the microstructure of the polybutadiene segments may consist of about 90 to about 95 percent, 1,4- structure and about 5 to 10 percent of the diene will enter the chain via the 1,2 addition to provide pendant vinyl groups randomly distributed among the polydiene segments. When there is essentially complete hydrogenation, the resulting block copolymers contain approximately one ethyl group for about every 15 methylene groups in the polyethylene. The presence of one ethyl group per 10 to 20 methylene units is sufficient to limit the crystallization of the polyethylene block segments in the unextended state and also contributes to the high optical clarity of the vinylcyclohexane-ethyl-substituted polyethylene block copolymers.

The presence of crystallizable polyethylene segments, and a limited amount of crystallization of these segments upon deformation contributes to the exceptional strength properties of these copolymers. The highest rigidity and tensile strength are usually obtained in those poly(vinylcyclohexane)-alkyl-substituted polyethylene block copolymers in which the lowest alkyl content of the polyethylene sequence occurs. Those vinylcyclohexane-alkyl polyethylene block copolymers possessing the highest tensile strengths and rigidity are also usually those wherein the polybutadiene portions of the styrene-butadiene block copolymer substrates, from which these copolymers are prepared, contain the maximum 1,4 content (less than about 10 percent vinyl content).

In given applications, it may be desirable to decrease the rigidity and density of the copolymers. This may be accomplished by increasing the amount of alkyl group substitutions along the polyethylene block sequence. When small amounts of aliphatic or cycloaliphatic ethers are used in the preparation of the vinylaromatic-diene block copolymer substrates, the amount of 1,2 polymerization of the diene is increased, which in turn, results in a higher concentration of pendant vinyl groups. Hydrogenation of these substrates leads to a proportionately increased alkyl group concentration along the polyethylene block sequences.

The hydrogenation of the vinyl aromatic hydrocarbon-diene block copolymer substrate to prepare the copolymers of this invention may be carried out by a variety of methods. The hydrogenation may be accomplished by placing the block copolymer substrate in a hydrocarbon solution in the presence of a suitable catalyst and applying hydrogen gas under pressure to this solution. The method may be either continuous or a batch process.

The substrate polymer concentration may vary between about 0.5 percent to about 30 percent by weight of the hydrocarbon solution and is preferably within a range of about 2 percent to about 20 percent.

Catalysts such as finely divided, supported and unsupported nickel, for example, nickel-on-kieselguhr, have been found to be very effective. The quantity of catalyst may be varied within a range of from about 0.1 to about 400 percent by weight of the polymer used. In commercial applications, it is desirable to keep down the residence time of the hydrogenation which may be achieved by high catalyst to polymer ratios. When the catalyst is used in high concentrations with respect to the polymer, it must, of course, be separable from the fully hydrogenated product for re-use as a catalyst.

Under certain reaction conditions, for example, above 225° C., it may be desirable to reduce the time in which the catalyst and polymer are in contact, which will also require a high catalyst/polymer ratio.

The hydrogen pressure utilized in hydrogenating the substrate is generally in the range of about 100 p.s.i. to about 5,000 p.s.i. and preferably within a range of between about 250 and 3,000 p.s.i.

The temperature of the reaction may range from about 100° C. up to the degradation temperature of the specific polymer substrate being hydrogenated. The temperature range is preferably between about 100° C. and about 350° C.

The reaction time under which the substrate is hydrogenated depends upon the conditions of the reaction and may vary between a few minutes and about 20 hours.

As mentioned, it is important that the hydrogenation reaction be carried out until there is less than 3 percent residual aromatic unsaturation. One of the benefits of carrying the reaction to a minimum of 97 percent complete hydrogenation in addition to the unique polymer properties so obtained, is that the catalyst may be more readily separated from the fully hydrogenated product by a number of techniques such as filtration, decantation, centrifugation, etc. Magnetic fields may be applied to further improve catalyst separation.

The following examples illustrate a great variety of vinylcyclohexane - alkyl - substituted ethylene block copolymers, both mixed and pure blocks, prepared in accordance with this invention. The examples are illustrative of the invention and are not meant to limit the invention in any way.

EXAMPLE 1

The following procedure was used in the preparation of the styrene-butadiene mixed block copolymer substrates utilized in this invention.

28 oz. polymerization bottles, equipped with Teflon coated magnetic stirring bars, were thoroughly dried in a forced air oven at 130° C. and cooled to room temperature under an argon purge. The bottles were capped, upon cooling under an argon purge, with a metal perforated crown cap. The crown cap was equipped with a neoprene imperforate liner. 550 ml. of cyclohexane was pressured into the polymerization bottle and was degassed by blowing argon through the rapidly stirred solvent.

A preselected amount of purified and distilled styrene was added via a syringe and argon purging was continued for a few minutes. The mixture was cooled to approximately 10° C. and while stirring a purging solution, prepared from benzene, α-methylstyrene, and n-butyllithium in hexane, was added until a permanent color change was detected. A preselected amount of purified and distilled butadiene was added to the polymerization bottle. A catalyst solution prepared from 25 ml. of 1.5 N n-butyllithium and 250 ml. of cyclohexane was added to the solution of styrene-butadiene. The amount of catalyst was determined by selecting the molecular weight required and utilizing the formula:

$$\text{Molecular Weight} = \frac{\text{Grams M of merno}}{\text{Moles of Catalyst}}$$

The polymerization bottle was placed in a water bath at 50° C. and stirred magnetically for from about 5 to about 18 hours. The reaction was terminated by adding a couple of milliters of tetrahydrofuran containing N-phenyl-β-naphthylamine and methanol. The polymerizations listed hereinbelow were carried out at a solids content of approximately 11 percent by weight.

The mixed block copolymers of styrene and butadiene listed in Table I were used as substrates to prepare the vinyl-cyclohexane mixed block copolymers of this invention. Under the column entitled "Designation," the type of copolymer is set forth as well as the weight percent of styrene in the copolymer. For example, in Run Number 1, 10 SB$^M$ designates a copolymer containing 10 percent by weight styrene and also designates that it is of a mixed block type.

TABLE I

| Run No. | Designation | Styrene wt., g. | Butadiene wt., g. | n-Butyl-lithium, mM. | η sp./c., c.=0.1 g., dl./g.$^{-1}$ |
|---|---|---|---|---|---|
| 1 | 10SB$^M$ | 6.3 | 54.0 | 0.46 | 1.32 |
| 2 | 15SB$^M$ | 9.2 | 51.0 | 0.46 | 1.38 |
| 3 | 15SB$^M$ | 8.35 | 47.2 | 0.85 | 0.80 |
| 4 | 15SB$^M$ | 8.20 | 46.2 | 0.84 | 0.81 |
| 5 | 20SB$^M$ | 12.8 | 52.1 | 0.60 | 1.25 |
| 6 | 20SB$^M$ | 12.8 | 51.2 | 0.60 | 1.30 |
| 7 | 25SB$^M$ | 13.7 | 41.3 | 0.51 | 1.27 |
| 8 | 25SB$^M$ | 14.0 | 41.8 | 0.85 | 0.84 |
| 9 | 25SB$^M$ | 14.1 | 42.5 | 0.85 | 0.85 |
| 10 | 25SB$^M$ | 15.1 | 45.8 | 1.0 | 0.73 |
| 11 | 49SB$^M$ | 30.0 | 31.5 | 0.31 | 1.65 |
| 12 | 56SB$^M$ | 36.0 | 28.2 | 0.32 | 1.53 |
| 13 | 70SB$^M$ | 45.5 | 19.1 | 0.50 | 1.36 |
| 14 | 70SB$^M$ | 38.5 | 16.3 | 0.23 | 1.18 |
| 15 | 70SB$^M$ | 38.5 | 16.4 | 0.23 | 1.12 |
| 16 | 70SB$^M$ | 42.0 | 18.0 | 0.30 | 1.49 |
| 17 | 70SB$^M$ | 42.0 | 18.7 | 0.30 | 1.58 |
| 18 | 70SB$^M$ | 35.2 | 16.5 | 0.16 | 1.95 |
| 19 | 74SB$^M$ | 45.5 | 16.1 | 0.25 | 2.12 |
| 20 | 80SB$^M$ | 48.0 | 12.6 | 0.25 | 1.35 |
| 21 | 80SB$^M$ | 48.0 | 12.6 | 0.25 | 1.37 |
| 22 | 80SB$^M$ | 40.0 | 11.2 | 0.21 | 1.13 |
| 23 | 80SB$^M$ | 40.0 | 10.0 | 0.21 | 1.16 |
| 24 | 85SB$^M$ | 45.5 | 8.3 | 0.26 | 0.97 |
| 25 | 85SB$^M$ | 46.0 | 8.3 | 0.26 | 0.95 |
| 26 | 85SB$^M$ | 46.3 | 8.3 | 0.26 | 1.00 |
| 27 | 85SB$^M$ | 51.0 | 9.4 | 0.25 | 1.09 |
| 28 | 85SB$^M$ | 51.0 | 9.4 | 0.25 | 1.10 |
| 29 | 90SB$^M$ | 43.2 | 4.8 | 0.24 | 1.19 |
| 30 | 90SB$^M$ | 54.6 | 6.25 | 0.24 | 1.11 |
| 31 | 90SB$^M$ | 50.5 | 5.9 | 0.21 | 1.73 |
| 32 | 90SB$^M$ | 50.5 | 5.9 | 0.21 | 1.43 |
| 33 | 95SB$^M$ | 45.6 | 2.6 | 0.24 | 1.28 |

EXAMPLE 2

The preparation of pure block polymers of styrene and butadiene was carried out in the following manner. 550 ml. of cyclohexane was added to a 28 oz. polymerization bottle as in Example 1. Pure styrene monomer was added to the cyclohexane solution, and the impurities were titrated with purging solution as in Example 1. The required amount of n-butyllithium in cyclohexane was added to produce the desired block length of polystyrene as calculated by the equation used in Example 1.

The polymerization bottle was placed in a 50° C. water bath and stirred via a magnetic stirring motor for three hours. The bottle was removed and cooled to approximately 23° C., weighed and pure butadiene was distilled into the polymerization bottle. After the desired weight of butadiene had been introduced, the bottle was again placed in the bath, and the polymerization was allowed to proceed until the butadiene was polymerized (approximately five hours). The reaction was terminated as in Example 1. In this manner, a pure polystyrene block is connected to a pure polybutadiene block. Pure SB block polymers prepared in this manner are shown in Table II.

In Table II, SBS denotes pure block polymers containing a central polybutadiene block linked to two terminal polystyrene blocks and BSB denotes pure block polymers containing a central polystyrene block connected to two terminal blocks of polybutadiene. These polymers were prepared by a continuation of the procedure set forth for SB blocks. After completion of the polymerization of the second monomer, the desired amount of new monomer was added. For example, in the preparation of the SBS polymers, the first styrene block was allowed to polymerize three hours at 50° and the butadiene block was allowed to polymerize for five hours at 50°. The last block, i.e., a polystyrene, was prepared in the same manner as the first polystyrene block, i.e., the purged monomer solution was added by a syringe directly into the polymerization bottle at 50°, and allowed to polymerize for three hours. This sequential addition was continued for the preparation of extended block copolymers such as SBSBS, which signified a polymer of alternating block structure. Polymers prepared in this manner are shown in Table II.

TABLE II

| Run No. | Designation | Styrene wt., g. | Butadiene wt., g. | n-Butyllithium, mM. | η sp./c., c.=0.1 g., dl./g. |
|---|---|---|---|---|---|
| 34 | 5SB | 2.4 | 46.9 | 0.37 | |
| 35 | 10SB | 4.8 | 42.7 | 0.37 | 2.03 |
| 36 | 15SB | 8.5 | 48.2 | 0.87 | 0.83 |
| 37 | 15SB | 7.2 | 41.8 | 0.37 | |
| 38 | 15SB | 7.2 | 40.4 | 0.73 | 0.79 |
| 39 | 15SB | 7.2 | 40.4 | 0.73 | 1.84 |
| 40 | 20SB | 11.5 | 46.0 | 0.51 | 1.33 |
| 41 | 20SB | 11.1 | 44.4 | 0.51 | 1.30 |
| 42 | 25SB | 14.2 | 42.5 | 1.22 | 0.71 |
| 43 | 25SB | 14.0 | 41.5 | 0.43 | 1.37 |
| 44 | 25SB | 12.8 | 38.2 | 0.39 | 0.98 |
| 45 | 25SB | 12.8 | 38.4 | 0.39 | 0.97 |
| 46 | 25SB | 12.8 | 39.2 | 0.39 | 0.96 |
| 47 | 25SB | 15.9 | 45.8 | 1.00 | 0.75 |
| 48 | 70SB | 36.1 | 14.9 | 0.18 | 1.14 |
| 49 | 70SB | 36.1 | 15.4 | 0.18 | |
| 50 | 75SB | 52.6 | 18.2 | 0.18 | 1.50 |
| 51 | 80SB | 40.3 | 10.6 | 0.17 | 1.24 |
| 52 | 80SB | 45.9 | 11.7 | 0.22 | 0.75 |
| 53 | 80SB | 45.8 | 12.1 | 0.22 | 0.75 |
| 54 | 85SB | 54.0 | 10.5 | 0.30 | 0.99 |
| 55 | 90SB | 49.8 | 5.6 | 0.27 | 0.77 |
| 56 | 90SB | 49.0 | 5.6 | 0.27 | 0.73 |
| 57 | 90SB | 44.9 | 5.5 | 0.17 | 1.07 |
| 58 | 90SB | 45.0 | 5.7 | 0.17 | 1.06 |

TABLE II.—Continued

| Run No. | Designation | Styrene wt., g. | | Butadiene wt., g. | n-Butyllithium, mM. | η sp./c., c.=0.1 g., dl./g. |
|---|---|---|---|---|---|---|
| | | Block | | | | |
| | | 1st | 2nd | | | |
| 59 | 15SBS | 3.8 | 3.8 | 43.2 | 0.39 | 1.59 |
| 60 | 15SBS | 4.5 | 4.6 | 52.2 | 0.94 | 0.85 |
| 61 | 15SBS | 4.7 | 4.7 | ª 52.2 | 0.94 | 0.88 |
| 62 | 20SBS | 5.5 | 5.5 | 44.1 | 0.42 | 1.45 |
| 63 | 25SBS | 7.1 | 7.2 | 42.9 | 0.43 | 1.32 |
| 64 | 25SBS | 6.8 | 6.7 | 40.3 | 1.19 | 0.68 |
| 65 | 25SBS | 6.7 | 6.7 | 40.6 | 1.19 | |
| 66 | 25SBS | 7.5 | 7.5 | 45.0 | 1.13 | 0.79 |
| 67 | 25SBS | 7.5 | 7.5 | 45.0 | 1.13 | |
| 68 | 25SBS | 7.5 | 7.5 | 45.0 | 0.92 | 0.81 |
| 69 | 25SBS | 7.5 | 7.5 | 45.0 | 1.0 | 0.87 |
| 70 | 25SBS | 7.5 | 7.5 | 45.0 | 1.0 | 0.83 |
| 71 | 40SBS | 12.0 | 12.0 | 41.7 | 0.61 | 0.92 |
| 72 | 70SBS | 18.9 | 18.2 | 15.5 | 0.18 | 1.33 |
| 73 | 70SBS | 18.1 | 19.3 | 15.1 | 0.17 | 1.60 |
| 74 | 70SBS | 18.7 | 19.0 | 15.0 | 0.17 | 1.60 |
| 75 | 70SBS | 18.1 | 16.8 | 15.3 | 0.22 | 1.30 |
| 76 | 70SBS | 18.1 | 16.8 | 15.1 | 0.22 | 1.35 |
| 77 | 70SBS | 18.1 | 18.0 | 17.0 | 0.33 | 1.00 |
| 78 | 80SBS | 22.9 | 20.2 | 10.9 | 0.33 | 1.08 |
| 79 | 80SBS | 22.9 | 20.3 | 12.1 | 0.33 | 1.03 |
| 80 | 80SBS | 22.9 | 19.6 | 11.8 | 0.33 | 1.01 |
| 81 | 80SBS | 22.6 | 20.2 | 12.5 | 0.20 | 1.20 |
| 82 | 85SBS | 22.2 | 20.7 | 7.6 | 0.17 | 1.00 |
| 83 | 85SBS | 21.4 | 20.7 | 7.9 | 0.17 | 1.10 |
| 84 | 90SBS | 24.6 | 24.2 | 5.7 | 0.21 | 1.34 |
| 85 | 90SBS | 24.3 | 23.8 | 5.8 | 0.21 | 1.32 |
| 86 | 90SBS | 24.5 | 24.6 | 5.5 | 0.23 | 1.25 |
| 87 | 90SBS | 24.6 | 25.1 | 5.4 | 0.23 | 1.17 |
| 88 | 80BSB | 41.0 | 5.1 | *5.2 | 0.34 | 0.98 |

*Butadiene added first and upon completion, styrene followed by another butadiene block.

EXAMPLE III

The preparation of pure block copolymers of styrene and isoprene was carried out in the manner described in Example 2, substituting isoprene for butadiene. The isoprene was purified and distilled before use. The polymers prepared are shown in Table III.

TABLE III

| Run No. | Designation | Styrene wt., g. | | Isoprene wt., g. | n-Butyllithium mM. | η sp./c., c.=0.1 g., dl./g. |
|---|---|---|---|---|---|---|
| | | 1st | 2nd | | | |
| 89 | 25SIS | 6.2 | 6.3 | 3.85 | 0.31 | 1.06 |
| 90 | 25SIS | 6.3 | 7.0 | 40.6 | 0.49 | 1.00 |
| 91 | 25SIS | 7.5 | 6.2 | 40.1 | 0.49 | 1.03 |
| 92 | 75SI | 40.7 | | 13.2 | 0.44 | 0.65 |
| 93 | 75SI | 40.7 | | 13.6 | 0.44 | 0.67 |
| 94 | 75SI | 40.7 | | 13.4 | 0.44 | 0.62 |

EXAMPLE 4

The microstructure of the polydiene portions of the polybutadiene-polystyrene pure block polymer chains was easily altered by the addition of tetrahydrofuran to the cyclohexane solvent. Relatively small amounts of tetrahydrofuran and similar compounds not only increase the 1,2 addition polymerization (increase vinyl content) of the butadiene, but also tend to randomize the structure. The procedure of having both monomers present initially, which produces mixed block structures in pure cyclohexane led to a more randomized structure if tetrahydrofuran were present. Consequently, the technique of sequential monomer addition (pure block formation) was used in preparing block polymers containing a high vinyl content. Using procedures as described in Example 2, styrene-butadiene pure block polymers containing high vinyl group content were prepared as shown in Table IV.

TABLE IV

| Run No. | Designation | Solvent | Styrene wt., g. | Butadiene wt., g. | n-Butyllithium, mM. | η sp./c., c.=0.1 g., dl./g. |
|---|---|---|---|---|---|---|
| 95 | 25SB (high 1,2) | 500 ml. cyclohexane 25 ml. THF | ¹ 13.8 | 41.9 | 0.46 | 1.12 |
| 96 | 70SB (1,2) S | 700 ml. cyclohexane 1 ml. THF | ¹ 18.1 | 15.0 | 0.18 | 1.49 |

¹ 3.5 hr.

The microstructure of the polydiene portions of polymers prepared in this and other examples was examined using infrared spectral techniques and some of these results are shown in Table V.

TABLE V

| Polymer from run | Designation | Infrared microstructure of polydiene block, percent by weight of polymer | |
|---|---|---|---|
| | | Vinyl | Trans |
| 47 | 25SB | 4.4 | 4.8 |
| 50 | 75SB | 1.7 | 15.2 |
| 96 | 70SB (1,2)S | 10.0 | |

EXAMPLE 5

The preparation of the vinylcyclohexane-alkyl polyethylene block copolymers consisted of the essentially complete hydrogenation of the styrene-butadiene block copolymers. These hydrogenations were carried out in cyclohexane with a nickel-on-kieselguhr catalyst in a one gallon stirred autoclave. A typical hydrogenation was conducted as follows.

100 g. of a nickel-on-kieselguhr catalyst was slurried in 1250 mls. of cyclohexane and placed in an argon-filled autoclave. 100 g. of a 25 SBS polymer, having a specific viscosity of 0.79 in benzene was dissolved in cyclohexane to a volume of 1250 mls. and placed in the autoclave. The system was pressured to 1930 p.s.i.g. with hydrogen at 32° and while stirring was heated to 175° C. The resulting pressure was 2500 p.s.i.g. After three hours and 26 minutes, the uptake of hydrogen had ceased and the pressure remained constant at 1900 p.s.i.g. for two hours and fifty minutes. The autoclave was cooled to room temperature, vented, flushed with argon and the charge blown through a heated Ultipore filter. A one liter rinse followed and the combined solution was passed through Filteraid in a heated pressure filter. The product (98.5) g. was isolated by precipitation in methanol from the clear, hot solution and dried at 70° C. in a vacuum drying oven. The specific viscosity in decalin at 135° was 0.91 dl./g. The other block copolymers were hydrogenated in a similar manner. The degree of hydrogenation of the block substrate polymers was determined by infrared analysis of thin films of the resulting polymers. The polymers prepared by the hydrogenation procedure outlined for the styrene block copolymers showed the complete disappearance of absorption bands characteristic of aliphatic unsaturation and little or no residual phenyl bands (<1%). The frequency used to measure styrene content was the 690 cm.$^{-1}$ band, which had been calibrated for precise styrene residue determinations.

Some of the physical properties of the various vinylcyclohexane-alkyl-substituted polyethylene block polymers are shown in Table VII and VIII. Some of the physical properties of the styrene-diene block copolymer substrates are shown in Table VI. In the tables, under tensile properties, the following abbreviations were used: T=Temperature, Y=Tensile Stress at Yield, U=Ultimate Tensile Strength, and E=Elongation. HDT is the heat distortion temperature as measured in a modified ASTM Test #648–56, modified in that the specimen dimensions were ⅛" x ¼" by ½" long and pressure was applied at the center of the ¼" x ½" surface parallel to the ⅛" x ¼" face. IS is the impact strength generally as measured by the notched Izod Method in dimensions of ft.lbs. per inch of notch; figures with a D following were measured using the Dynstat impact strength technique and dimensions are in kg.cm./cm.$^2$. Flex. Mod. is the flexural modulus of the material.

The designation of the vinylcyclohexane-alkyl-substituted polyethylene block polymers consist of the description of the unsaturated block copolymers from which they were prepared followed by the letter R.

TABLE VI

| Polymer from run number | Designation | Tensile properties | | | | HDT, °C. | I.S. | Flexural modulus, p.s.i. | Density |
|---|---|---|---|---|---|---|---|---|---|
| | | Temp., °C. | Y, p.s.i. | U. p.s.i. | E, percent | | | | |
| 7 | 25SB$^M$ | 25 | | 110 | <5 | | | | |
| | | 50 | | 100 | <5 | | | | |
| | | 75 | | | | | | | |
| 14 | 70SB$^M$ | 25 | 2,170 | 1,660 | 200 | 90 | 0.7 | | 1.02 |
| | | 50 | 1,470 | 1,150 | 48 | | | | |
| | | 75 | 970 | 820 | 9 | | | | |
| 17 | 70SB$^M$ | 25 | 2,320 | 1,963 | 40 | 95 | 1.9 | | |
| 18 | 70SB$^M$ | | | | | 97 | 3.5 | 120,000 | |
| 20 | 80SB$^M$ | 25 | 4,226 | 4,226 | 5 | 94 | 0.5 | | |
| 23 | 85SB$^M$ | 25 | 4,570 | 4,530 | 6 | 97 | 0.3 | | |
| 40 | 20SB | 25 | 110 | 83 | 250 | | | | |
| | | 50 | 100 | 92 | 100 | | | | |
| | | 75 | | 75 | 60 | | | | |
| 44–46 | 25SB | 25 | | 30 | <5 | | | | |
| 48 | 70SB | 25 | 3,280 | | <5 | 100 | 0.4 | 190,000 | |
| | | 50 | | 2,710 | <5 | | | | |
| | | 75 | 2,160 | 1,320 | <5 | | | | |
| 51 | 80SB | 25 | | 4,720 | <5 | 105 | 0.4 | 275,000 | |
| | | 50 | | 3,610 | <5 | | | | |
| | | 75 | 2,760 | | <5 | | | | |
| 62 | 20SBS | 25 | 150 | 450 | 1,200 | | | | |
| | | 50 | 140 | 330 | 1,200+ | | | | |
| | | 75 | 140 | 170 | 1,050 | | | | |
| 83 | 85SBS | 25 | 4,900 | 4,870 | 9 | 103 | 0.3 | 330,000 | |
| | | 50 | 3,920 | 3,840 | 5 | | | | |
| | | 75 | 3,160 | 3,030 | 5 | | | | |
| 88 | 80BSB | 25 | | 2,630 | <5 | | | | |
| | | 50 | | 2,480 | <5 | | | | |
| | | 75 | | 2,040 | <5 | | | | |
| 90–91 | 25SIS | 25 | 67 | 550 | 67 | | | | |
| 92–94 | 75SIS | 25 | | 2,490 | <5 | 97 | 0.2 | | |

TABLE VII

Preparation and properties of the vinylcyclohexane-alkyl polyethylene block polymers

| Vinyl cyclohexane block polymer | Prepared from substrate Run No. | Designation | η sp./c. Decalin, 135° C. | Tensile | | | | HDT, °C. | I.S., ft. lb. | Flex. mod., p.s.i. |
|---|---|---|---|---|---|---|---|---|---|---|
| | | | | T, °C. | Y, p.s.i. | U, p.s.i. | E, p.s.i. | | | |
| 97 | 1 | 10SB$^M$R | 1.72 | 25 | 1,220 | 3,440 | 640 | | | |
| | | | | 50 | 970 | 2,480 | 630 | | | |
| | | | | 75 | 570 | 1,940 | 700 | | | |
| 98 | 2 | 15SB$^M$R | 1.64 | 25 | 1,240 | 4,240 | 580 | | | |
| | | | | 50 | 1,090 | 3,050 | 540 | | | |
| | | | | 75 | 510 | 2,740 | 730 | | | |

TABLE VII.—Continued

| Vinyl cyclohexane block polymer | Prepared from substrate Run No. | Designation | η sp./c. Decalin, 135° C. | Tensile T, °C | Y, p.s.i. | U, p.s.i. | E, p.s.i. | HDT, °C | I.S., ft. lb. | Flex. mod., p.s.i. |
|---|---|---|---|---|---|---|---|---|---|---|
| 99 | 3, 4 | 15SB$^M$R | 1.27 | 25 | 1,300 | 3,200 | 800 | | | |
| | | | | 50 | 810 | 2,050 | 830 | | | |
| | | | | 75 | 520 | 1,070 | 840 | | | |
| 100 | 5, 6 | 20SB$^M$R | 1.74 | 25 | 1,140 | 2,770 | 430 | | | |
| | | | | 50 | 840 | 2,600 | 540 | | | |
| | | | | 75 | 450 | 2,000 | 590 | | | |
| 101 | 7 | 25SB$^M$R | 1.53 | 25 | 1,270 | 2,930 | 350 | | | |
| | | | | 50 | 800 | 2,480 | 390 | | | |
| | | | | 75 | 370 | 1,680 | 660 | | | |
| 102 | 8, 9 | 25SB$^M$R | 0.99 | 25 | 1,300 | 4,380 | 900 | | | |
| | | | | 50 | 800 | 2,770 | 1,000 | | | |
| | | | | 75 | 510 | 1,230 | 950 | | | |
| 103 | 10 | 25SB$^M$R | 0.88 | 25 | 1,100 | 2,800 | 630 | | | |
| 104 | 11 | 40SB$^M$R | 1.88 | 25 | 1,800 | 4,300 | 570 | | | |
| | | | | 50 | | 3,800 | 380 | 100 | | |
| | | | | 100 | 3,700 | | 200 | | | |
| 105 | 12 | 56SB$^M$R | 1.67 | 25 | 2,200 | 3,500 | 445 | 114 | | |
| 106 | 13 | 70SB$^M$R | 1.17 | 25 | 3,600 | 3,900 | 230 | | | |
| | | | | 50 | 2,090 | 2,900 | 250 | 132 | 25D | 120,000 |
| | | | | 100 | 1,300 | | <5 | | | |
| 107 | 14, 15 | 70SB$^M$R | 1.08 | 25 | 3,450 | 3,090 | 48 | | | |
| | | | | 50 | 2,700 | 2,740 | 140 | 136 | 0.6 | 133,000 |
| | | | | 75 | 1,610 | 1,360 | 260 | | | |
| 108 | 16, 17 | 70SB$^M$R | 1.47 | 25 | 3,400 | 3,800 | 100 | | 31D | 150,000 |
| | | | | | | | | 129 | 1.9 | |
| 109 | 18 | 70SB$^M$R | 1.95 | | | | | 136 | 11.1 | 130,000 |
| 110 | 19 | 74SB$^M$R | 1.82 | 25 | 3,400 | 3,500 | 35 | | | |
| | | | | 50 | 2,800 | 2,800 | 35 | 137 | 30D | 120,000 |
| | | | | 100 | 1,300 | | <5 | | | |
| 111 | 20, 21 | 80SB$^M$R | 1.13 | 25 | | 4,800 | 10 | 138 | 0.9 | 260,000 |
| | | | | | | | | | 14D | |
| 112 | 22, 23 | 80SB$^M$R | 1.02 | 25 | 4,400 | 4,400 | 8= | 123 | 0.55 | |
| 113 | 24-25-26 | 85SB$^M$R | 0.76 | 25 | | 5,340 | <5 | | | |
| | | | | 50 | 4,840 | 4,470 | 5 | 131 | 0.5 | 276,000 |
| | | | | 75 | | 3,390 | <5 | | | |
| 114 | 27, 28 | 85SB$^M$R | 0.81 | 25 | 5,100 | | <5 | | | |
| | | | | 50 | 3,900 | 3,600 | 7 | 128 | 14D | |
| | | | | 100 | 2,000 | | <5 | | | |
| 115 | 29 | 90SB$^M$R | 0.72 | 25 | | 4,600 | <5 | 119 | 4.0D | |
| 116 | 30 | 90SB$^M$R | 0.89 | 25 | | 5,560 | <5 | | | |
| | | | | 50 | | 4,490 | <5 | 132 | 5D | |
| | | | | 75 | | 3,500 | <5 | | | |
| 117 | 31, 32 | 90SB$^M$R | 1.02 | 25 | | 3,500 | <5 | | | |
| | | | | 50 | | 5,060 | 5 | 120 | 0.3 | 200,000 |
| | | | | 75 | | 3,230 | <5 | | | |
| 118 | 33 | 95SB$^M$R | 0.75 | 25 | | 5,400 | <5 | 117 | 3D | |
| 119 | 34 | 5SBR | 2.84 | 25 | 1,400 | 2,800 | 610 | | | |
| 120 | 35 | 10SBR | 2.55 | 25 | 1,400 | 2,800 | 530 | | | |
| 121 | 36 | 15SBR | 1.04 | 25 | 1,440 | 2,560 | 720 | | | |
| | | | | 50 | 1,040 | 1,540 | 500 | | | |
| | | | | 75 | 680 | 800 | 350 | | | |
| 122 | 37 | 15SBR | 1.97 | 25 | 1,400 | 2,900 | 650 | | | |
| 123 | 38, 39 | 15SBR | 1.01 | 25 | 1,270 | 3,670 | 900 | | | |
| | | | | 50 | 870 | 2,150 | 900 | | | |
| | | | | 75 | 570 | 1,190 | 800 | | | |
| 124 | 40 | 20SBR | 1.72 | 25 | 1,530 | 2,270 | 400 | | | |
| | | | | 50 | 1,110 | 1,540 | 270 | | | |
| | | | | 75 | 680 | 920 | 210 | | | |
| 125 | 41 | 20SBR | 1.85 | 25 | | 2,600 | 460 | | | |
| 126 | 42 | 25SB | 0.82 | 25 | | 1,770 | 100 | | | |
| | | | | 50 | 860 | 1,190 | 70 | | | |
| | | | | 75 | 600 | 760 | 40 | | | |
| 127 | 43 | 25SB | 1.76 | 25 | 1,690 | 4,100 | 780 | | | |
| | | | | 50 | 1,200 | 2,610 | 660 | | | |
| | | | | 75 | 800 | 1,540 | 550 | | | |
| 128 | 44-45-46 | 25SBR | 1.25 | 25 | 1,820 | 3,420 | 600 | | | |
| | | | | 50 | 1,340 | 2,590 | 600 | | | |
| | | | | 75 | 830 | 1,360 | 370 | | | |
| 129 | 47 | 25SBR | 0.85 | 25 | 1,600 | 1,900 | 250 | | | |
| 130 | 48, 49 | 70SBR | 0.86 | 25 | | 4,730 | <5 | | | |
| | | | | 50 | | 3,420 | <5 | 140 | 0.4 | 320,000 |
| | | | | 75 | | 3,430 | <5 | | | |
| 131 | 50 | 75SBR | 1.44 | 25 | | 4,300 | <5 | | | |
| | | | | 50 | 4,400 | | <5 | 139 | 17D | |
| | | | | 100 | 2,100 | | <5 | | | |
| 132 | 51 | 80SBR | 1.05 | 25 | | 5,100 | <5 | | | |
| | | | | 50 | | 4,650 | <5 | 139 | 0.6 | 400,000 |
| | | | | 75 | | 3,250 | <5 | | | |
| 133 | 52, 53 | 80SBR | 0.67 | Too brittle to mold | | | | | | |
| 134 | 54 | 85SBR | 0.64 | | | | | 134 | 3D | |
| 135 | 55, 56 | 90SBR | 0.73 | 25 | | 2,000 | <5 | | | |
| | | | | 50 | | 3,150 | <5 | 119 | <0.1 | |
| | | | | 75 | | 3,200 | <5 | | | |

TABLE VII.—Continued

| Vinyl cyclohexane block polymer | Prepared from substrate Run No. | Designation | η sp./c. Decalin, 135° C. | T, °C. | Tensile Y, p.s.i. | U, p.s.i. | E, p.s.i. | HDT, °C. | I.S., ft. lb. | Flex. mod., p.s.i. |
|---|---|---|---|---|---|---|---|---|---|---|
| 136 | 57, 58 | 90SBR | 0.81 | 25 | ---- | 3,360 | <5 | 135 | 0.2 | 390,000 |
|  |  |  |  | 50 | ---- | 3,990 | <5 |  |  |  |
|  |  |  |  | 75 | ---- | 3,680 | <5 |  |  |  |
| 137 | 59 | 15SBSR | 2.02 | 25 | 1,140 | 2,400 | 500 |  |  |  |
|  |  |  |  | 50 | 740 | 1,480 | 400 |  |  |  |
|  |  |  |  | 75 | 600 | 1,660 | 700 |  |  |  |
| 138 | 60, 61 | 15SBSR | 1.17 | 25 | 1,330 | 3,190 | 850 |  |  |  |
|  |  |  |  | 50 | 1,000 | 2,290 | 780 |  |  |  |
|  |  |  |  | 75 | 630 | 1,390 | 800 |  |  |  |
| 139 | 62 | 20SBSR | 1.83 | 25 | 1,450 | 3,450 | 690 |  |  |  |
|  |  |  |  | 50 | 1,020 | 3,100 | 590 |  |  |  |
|  |  |  |  | 75 | 630 | 2,070 | 740 |  |  |  |
| 140 | 63 | 25SBSR | 1.62 | 25 | 2,040 | 3,030 | 350 |  |  |  |
|  |  |  |  | 50 | 1,370 | 2,960 | 450 |  |  |  |
|  |  |  |  | 75 | 915 | 2,420 | 450 |  |  |  |
| 141 | 64, 65 | 25SBSR | 0.93 | 25 | 1,700 | 2,710 | 600 |  |  |  |
|  |  |  |  | 50 | 1,280 | 1,940 | 500 |  |  |  |
|  |  |  |  | 75 | 830 | 1,170 | 550 |  |  |  |
| 142 | 66, 67 | 25SBSR | 0.91 | 25 | 1,780 | 4,550 | 800 |  |  |  |
|  |  |  |  | 50 | 1,300 | 3,680 | 820 |  |  |  |
|  |  |  |  | 75 | 820 | 2,600 | 850 |  |  |  |
|  |  |  |  | HST | 2,220 | 3,190 | 710 |  |  |  |
| 143 | 68 | 25SBSR | 0.96 | 25 | 1,820 | 2,800 | 440 |  |  |  |
|  |  |  |  | 50 | 1,340 | 2,280 | 500 |  |  |  |
|  |  |  |  | 75 | ---- | 1,370 | 430 |  |  |  |
| 144 | 69, 70 | 25SBSR | 1.07 | 25 | 1,590 | 3,560 | 590 |  |  |  |
|  |  |  |  | 50 | 1,450 | 3,070 | 670 |  |  |  |
|  |  |  |  | 75 | 500 | 2,560 | 720 |  |  |  |
| 145 | 71 | 40SBSR | 1.10 | 25 | 2,400 | 4,500 | 540 |  |  | 50,000 |
|  |  |  |  | 50 | 1,600 | 4,000 | 720 |  |  |  |
|  |  |  |  | 100 | ---- | 1,500 | 680 |  |  |  |
| 146 | 72 | 70SBSR | ---- | 25 | 4,530 | 4,230 | <5 | 132 | 0.9 | 250,000 |
|  |  |  |  | 50 | 3,990 | 3,940 | 8 |  |  |  |
|  |  |  |  | 75 | 2,820 | 2,470 | 100 |  |  |  |
| 147 | 73 | 70SBSR | 1.52 | 25 | 4,470 | 4,360 | 7 | 132 | 1.0 | 290,000 |
|  |  |  |  | 50 | 3,750 | 3,750 | <5 |  |  |  |
|  |  |  |  | 75 | 2,940 | 2,870 | 9 |  |  |  |
| 148 | 74, 75 | 70SBS | 1.29 | 25 | 4,690 | 4,690 | 6 | 138 | 1.1 | 280,000 |
|  |  |  |  | 50 | 3,920 | 3,920 | 6 |  |  |  |
|  |  |  |  | 75 | 3,300 | 3,300 | <5 |  |  |  |
| 149 | 76, 77 | 70SBSR | 0.98 | 25 | 4,910 | ---- | 7 | 132 | 0.7 | 284,000 |
|  |  |  |  | 50 | 4,170 | 3,880 | 12 |  |  |  |
|  |  |  |  | 75 | 3,300 | 3,070 | 28 |  |  |  |
| 150 | 78-79-80 | 80SBS | 0.88 | 25 | 5,140 | 5,180 | 7 | 137 | 0.6 | 410,000 |
|  |  |  |  | 50 | 4,230 | 4,230 | 7 |  |  | 365,000 |
|  |  |  |  | 75 | 3,380 | 3,360 | 6 |  |  |  |
| 151 | 81 | 80SBSR | 1.02 | 25 | ---- | 4,880 | <5 | 144 | 0.5 | 380,000 |
|  |  |  |  | 50 | ---- | 4,190 | <5 |  |  |  |
|  |  |  |  | 75 | ---- | 3,470 | <5 |  |  |  |
| 152 | 82 | 85SBSR | 0.65 | 25 | ---- | 3,500 | <5 | 116 | 0.3 | 350,000 |
|  |  |  |  | 50 | ---- | 2,790 | <5 |  |  |  |
|  |  |  |  | 75 | ---- | 2,700 | <5 |  |  |  |
| 153 | 83 | 85SBSR | 1.18 | 25 | ---- | 4,490 | 8 | 135 | 0.6 | 230,000 |
|  |  |  |  | 50 | ---- | 3,530 | <5 |  |  |  |
|  |  |  |  | 75 | ---- | 2,540 | <5 |  |  |  |
| 154 | 84, 85 | 90SBSR | 0.99 | 25 | ---- | 4,110 | <5 | 126 | 0.3 | 370,000 |
|  |  |  |  | 50 | ---- | 5,240 | 5 |  |  |  |
|  |  |  |  | 75 | ---- | 3,120 | <5 |  |  |  |
| 155 | 86, 87 | 90SBSR | 1.02 | 25 | ---- | 5,380 | <5 | 136 | 0.6 | ---- |
|  |  |  |  | 50 | ---- | 5,200 | 6 |  |  |  |
|  |  |  |  | 75 | ---- | 4,000 | 6 |  |  |  |
| 156 | 88 | 80SBSR | 0.83 | Too brittle to mold |  |  |  | 135 | 0.2 | ---- |
| 157 | 89 | 25SISR | 1.39 | 25 | 240 | 1,390 | 1,000 |  |  |  |
|  |  |  |  | 50 | 260 | 870 | 1,000 |  |  |  |
|  |  |  |  | 75 | 240 | 590 | 1,200 |  |  |  |
| 158 | 90, 91 | 25SISR | 1.37 | 25 | ---- | 1,120 | 960 |  |  |  |
|  |  |  |  | 50 | ---- | 820 | 1,000 |  |  |  |
|  |  |  |  | 75 | ---- | 460 | 1,060 |  |  |  |
| 159 | 91-93-94 | 75SIR | 0.46 | 25 | ---- | 2,860 | <5 | 117 |  |  |
|  |  |  |  | 50 | ---- | 2,230 | <5 |  |  |  |
|  |  |  |  | 75 | ---- | 1,320 | <5 |  |  |  |
| 160 | 95 | 25SB(1,2)R | 0.89 | 25 | 125 | 86 | 1,140 |  |  |  |
| 161 | 96 | 70SB(1,2)SR | 1.31 | 25 | 3,480 | 3,190 | 9 | 140 | 1.3 | 200,000 |
|  |  |  |  | 50 | 2,790 | 2,520 | 10 |  |  |  |
|  |  |  |  | 75 | 2,100 | 1,910 | 17 |  |  |  |

As mentioned, it is an essential aspect of this invention that the overall balance of favorable properties of the vinylcyclohexane block polymers is achieved only by essentially complete hydrogenation of the vinyl aromatic-diene block polymers. It is preferred that less than three percent total residual unsaturation remain in the polymer. The deleterious influence of small amounts of residual unsaturation on properties is clearly shown in the weatherometer test data shown in Table VIII.

TABLE VIII.—WEATHEROMETER AGING PROPERTIES

| Polymer No. | Prepared from substrate number | Degree of hydrogenation | Hours exposure weatherometer | Tensile properties Y, p.s.i. | U, p.s.i. | E, percent | Remarks |
|---|---|---|---|---|---|---|---|
| 140 | 25SBS from Run 63. | >99% | 0 | 2,040 | 3,040 | 350 | Tough and flexible. |
| 140 | do | | 280 | 2,260 | 2,060 | 150 | Still tough and flexible. |
| 162 | do | Ca. 95%, —5%, residual styrene unsaturation. | 0 | 1,840 | 2,740 | 330 | Tough and flexible. |
| 162 | do | | 280 | ---- | 1,260 | <5 | Completely embrittled. |

Table VIII.—Continued

| Polymer No. | Prepared from substrate number | Degree of hydrogenation | Hours exposure weatherometer | Tensile properties Y, p.s.i. | U, p.s.i. | E, percent | Remarks |
|---|---|---|---|---|---|---|---|
| 145 | 70SBS from Run 71. | >99% | 0 | 4,530 | 4,230 | <5 | Flexible, 0.9 notched izod |
| 145 | do | | 165 | | 4,360 | <5 | Still flexible. |
| 163 | do | Ca. 90%, 10% residual styrene unsaturation. | 0 | | 4,280 | <5 | Flexible, 0.8 notched izod. |
| 163 | do | | 165 | | 3,110 | <5 | Completely embrittled. |

It will be noted from the examples that the vinylcyclohexane-alkyl-substituted polyethylene block copolymers containing from about 8 to about 50 mole percent of a vinylcyclohexane structural unit in polymeric block sequence are flexible, clear, thermoplastic materials of excellent tensile strength and extensibility.

Those block copolymers of this invention containing from about 8 to about 50 mole percent vinylcyclohexane structural units in polymeric block sequences have significantly higher tensile strengths than the styrene-diene block copolymer substrates from which they are prepared. This is especially true where the polydiene substrate sequences are predominantly of the 1,4 type. For example, the styrene-butadiene block polymer substrate prepared in Run 7 of Example 1 was a very poor molding product which crumbled easily. In contrast, the vinylcyclohexane block copolymer prepared by the essentially complete hydrogenation of this substrate possessed an ultimate tensile strength of about 3,000 p.s.i. and formed tough, clear, flexible, molded products. This copolymer also showed excellent low temperature flexibility, as low as −87° C. Additionally, films prepared from this copolymer when extended, showed good recovery to original dimensions when heated. Generally, the tensile strengths of the vinylcyclohexane block copolymers increased as the amount of vinylcyclohexane polymeric block sequences increased, and the yield strengths of the pure block vinylcyclohexane polymers were slightly higher than those of the mixed block polymers.

As mentioned, the microstructure of the substrate polymer plays a great part in the physical and chemical properties of the hydrogenated block copolymers prepared from the substrate. Those copolymers prepared by the essentially complete hydrogenation of styrene-butadiene block polymer substrates, in which over 90 percent of the polybutadiene portion was polymerized 1,4 had an observed tensile strength within a range of about 2500 to about 5,000 p.s.i. Those vinylcyclohexane-ethylene block copolymers prepared via essentially complete hydrogenation of a styrene-butadiene block polymer substrate containing a major portion of 1,2 poly(butadiene) content, e.g. Run 95, had a very low tensile strength (less than 100 p.s.i.) though these copolymers formed highly extensible and flexible films. The vinylcyclohexane-block copolymers prepared by the essentially complete hydrogenation of isoprene-styrene block copolymers containing a majority of 1,4-polyisoprene block sequences formed highly flexible, clear, reasonably tough moldings, however, their tensile strengths were lower than those of the polymers prepared from the essentially complete hydrogenation of polystyrene-1,4-polybutadiene block structures.

It will be noted from the examples that those vinylcyclohexanealkyl-substituted polyethylene block copolymers containing in excess of about 50 mole percent vinylcyclohexane structural units are rigid, clear thermoplastics exhibiting high heat distortion temperatures and high tensile strengths. Also, those polymers containing in excess of about 82 mole percent vinylcyclohexane structural units exhibit inferior physical properties. The pure block vinylcyclohexane polymers containing from about 50 mole percent vinylcyclohexane structural units to about 82 mole percent vinylcyclohexane structural units were generally more rigid than the mixed block copolymers and possessed somewhat higher heat distortion temperatures with slightly lower impact strengths. The vinylcyclohexane block polymers prepared from the essentially complete hydrogenation of ternary styrene-butadiene-styrene block polymers had higher impact strengths than those polymers prepared from the hydrogenation of the binary styrene-butadiene polymers.

In the aforementioned copolymers, i.e., those containing an excess of 50 mole percent vinylcyclohexane structural units, the microstructure also influenced the physical and chemical properties of the copolymer. As the ethyl group content of the polyethylene block was increased, the impact strength was increased and the tensile strengths and rigidity were decreased.

What is claimed is:

1. A rigid, optically clear, block copolymer having the general configuration S–B$^m$ comprising from about 10 percent by weight to about 95 percent by weight hydrogenated polyvinyl aromatic blocks (S) and correspondingly from about 5 percent by weight to about 90 percent by weight hydrogenated conjugated polydiene blocks (B) wherein the unsaturation of the polymer is reduced by hydrogenation to a value of less than 3 percent residual aromatic unsaturation and wherein the block polymer is a mixed block polymer as indicated by $m$.

2. A block polymer having the general configuration S–B comprising from about 90 to about 5 percent by weight hydrogenated vinyl aromatic blocks (S) and correpondingly from about 10 percent to about 95 percent by weight hydrogenated conjugated diene blocks (B) wherein the unsaturation of the polymer is reduced by hydrogenation to a value of less than 3 percent residual aromatic unsaturation and wherein the block polymer is a pure block polymer.

3. The block polymer of claim 1 wherein the conjugated diene blocks are polybutadiene and the vinyl aromatic blocks are polystyrene.

4. The block polymer of claim 2 wherein the conjugated diene blocks are polybutadiene and the vinyl aromatic blocks are polystyrene.

References Cited

UNITED STATES PATENTS

| 3,231,635 | 1/1966 | Holden et al. | 260—876XR |
| 3,242,038 | 3/1966 | Dallas et al. | 161—253 |
| 3,333,024 | 7/1967 | Haefele et al. | 260—880 |
| 2,864,809 | 12/1958 | Jones et al. | 260—85.1 |
| 2,975,160 | 3/1961 | Zelinski | 260—83.7 |
| 3,239,478 | 3/1966 | Harlan, Jr. | 260—880XR |
| 3,431,323 | 3/1969 | Jones | 260—880 |

FOREIGN PATENTS

| 621,955 | 6/1961 | Canada | 260—94.7H |

JAMES A. SEIDLECK, Primary Examiner

U.S. Cl. X.R.

260—880B

UNITED STATES PATENT OFFICE
CERTIFICATE OF CORRECTION

Patent No. 3,598,886      Dated August 10, 1971

Inventor(s) Donald F. Hoeg et al.

It is certified that error appears in the above-identified patent and that said Letters Patent are hereby corrected as shown below:

Column 6, lines 20 to 24, "Grams M oofmerno" should read -- Grams of Monomer --.

Signed and sealed this 1st day of August 1972.

(SEAL)
Attest:

EDWARD M. FLETCHER, JR.       ROBERT GOTTSCHALK
Attesting Officer      Commissioner of Patents